United States Patent
Solheim et al.

(10) Patent No.: US 9,594,181 B2
(45) Date of Patent: Mar. 14, 2017

(54) FILTERING AND PRESENTATION OF HEADING OBSERVATIONS FOR COIL SHOOTING

(75) Inventors: Stig Solheim, Oesteraas (NO); Kjell Saeten, Asker (NO)

(73) Assignee: WESTERNGECO L.L.C., Houston, TX (US)

( * ) Notice: Subject to any disclaimer, the term of this patent is extended or adjusted under 35 U.S.C. 154(b) by 647 days.

(21) Appl. No.: 12/468,604

(22) Filed: May 19, 2009

(65) Prior Publication Data

US 2009/0310440 A1  Dec. 17, 2009

Related U.S. Application Data (60) Provisional application No. 61/061,357, filed on Jun. 13, 2008.

(51) Int. Cl.
*G01V 1/38* (2006.01)

(52) U.S. Cl.
CPC .......... *G01V 1/3808* (2013.01); *G01V 1/3817* (2013.01); *G01V 2200/14* (2013.01)

(58) Field of Classification Search
CPC ........................... G01V 1/3808; G01V 1/3817
USPC ....................................................... 367/15–20
See application file for complete search history.

(56) References Cited

U.S. PATENT DOCUMENTS

| | | | |
|---|---|---|---|
| 2,404,440 A | 7/1946 | Holm | |
| 2,465,696 A | 3/1949 | Pasley | |
| 2,693,862 A | 11/1954 | Reiber | |
| 2,823,375 A | 2/1958 | Camp | |
| 3,283,293 A | 11/1966 | Pavey et al. | |
| 3,331,050 A | 7/1967 | Kilmer et al. | |
| 3,440,992 A | 4/1969 | Chance | |
| 3,505,577 A | 4/1970 | Hirokawa | |
| 3,506,674 A | 4/1970 | Berger | |
| 3,560,912 A | 2/1971 | Spink et al. | |
| 3,581,273 A | 5/1971 | Hedberg | |
| 3,605,674 A | 9/1971 | Weese | |
| 3,774,570 A | 11/1973 | Pearson | |
| 3,806,863 A | 4/1974 | Tilley et al. | |
| 3,896,756 A | 7/1975 | Pearson et al. | |
| 3,921,124 A | 11/1975 | Payton | |
| 3,934,220 A | 1/1976 | Davis | |

(Continued)

FOREIGN PATENT DOCUMENTS

| EP | 0 018053 A1 | 10/1980 |
|---|---|---|
| EP | 0 018053 B1 | 12/1983 |

(Continued)

OTHER PUBLICATIONS

Beasley, et al.; A New Look at Simultaneous Sources; SEG Expanded Abstracts; 1998.

(Continued)

*Primary Examiner* — Krystine Breier (57) ABSTRACT

The presently disclosed technique includes a method that compensates for constantly changing headings as occur during coil shooting acquisition. In one aspect, the presently disclosed techniques include a computer-readable program storage medium comprising: accessing a set of heading data for a seismic spread acquired while traversing a curved path; and normalizing the accessed heading data to a dynamic frame of reference defined relative to the seismic spread.

24 Claims, 5 Drawing Sheets

(56) References Cited

U.S. PATENT DOCUMENTS

| | | |
|---|---|---|
| 3,953,827 A | 4/1976 | Le Moal et al. |
| 4,033,278 A | 7/1977 | Waters |
| 4,068,208 A | 1/1978 | Rice, Jr. et al. |
| 4,074,648 A | 2/1978 | Reid et al. |
| 4,086,504 A | 4/1978 | Ezell et al. |
| 4,146,870 A | 3/1979 | Ruehle |
| 4,231,111 A * | 10/1980 | Neeley ................ G01V 1/3835 114/253 |
| 4,290,124 A | 9/1981 | Cole |
| 4,353,121 A | 10/1982 | Ray et al. |
| 4,383,259 A | 5/1983 | Rader |
| 4,404,664 A | 9/1983 | Zachariadis |
| 4,468,663 A * | 8/1984 | Kalt ........................ 340/815.4 |
| 4,486,863 A * | 12/1984 | French ................ G01V 1/3808 367/117 |
| 4,648,080 A | 3/1987 | Hargreaves |
| 4,657,482 A | 4/1987 | Neal |
| 4,669,067 A | 5/1987 | Roberts |
| 4,669,097 A | 5/1987 | Bristol |
| 4,709,355 A | 11/1987 | Woods et al. |
| 4,729,333 A | 3/1988 | Kirby et al. |
| 4,757,482 A | 7/1988 | Fiske, Jr. |
| 4,803,668 A | 2/1989 | Berryhill et al. |
| 4,834,181 A | 5/1989 | Uhri et al. |
| 4,890,568 A | 1/1990 | Dolengowski |
| 4,894,807 A | 1/1990 | Alam et al. |
| 4,912,684 A | 3/1990 | Fowler |
| 4,942,991 A | 7/1990 | Lyons |
| 4,960,183 A | 10/1990 | Young, II |
| 4,965,773 A | 10/1990 | Marschall |
| 4,970,696 A | 11/1990 | Crews et al. |
| 4,970,697 A | 11/1990 | Earley et al. |
| 4,992,990 A | 2/1991 | Langeland et al. |
| 4,992,991 A | 2/1991 | Young et al. |
| 4,992,992 A | 2/1991 | Dragoset, Jr. |
| 5,031,159 A | 7/1991 | Rouquette |
| 5,128,904 A | 7/1992 | Chambers |
| 5,179,905 A | 1/1993 | Hossfield et al. |
| 5,200,930 A | 4/1993 | Rouquette |
| 5,300,929 A | 4/1994 | MacLeod |
| 5,329,071 A | 7/1994 | Vatne et al. |
| 5,353,223 A | 10/1994 | Norton et al. |
| 5,430,689 A | 7/1995 | Rigsby et al. |
| 5,443,027 A | 8/1995 | Owsley et al. |
| H001490 H | 9/1995 | Thompson et al. |
| 5,508,973 A | 4/1996 | Mallick et al. |
| 5,532,975 A | 7/1996 | Elholm |
| 5,546,882 A | 8/1996 | Kuche |
| 5,555,531 A | 9/1996 | Booth et al. |
| 5,640,325 A | 6/1997 | Banbrook et al. |
| 5,668,775 A | 9/1997 | Hatteland |
| 5,677,893 A | 10/1997 | de Hoop et al. |
| 5,682,357 A | 10/1997 | Rigsby |
| 5,761,152 A | 6/1998 | Jacobsen et al. |
| 5,790,472 A | 8/1998 | Workman et al. |
| 5,973,995 A | 10/1999 | Walker et al. |
| 5,978,316 A | 11/1999 | Ambs et al. |
| 6,011,752 A | 1/2000 | Ambs et al. |
| 6,011,753 A | 1/2000 | Chien |
| 6,028,817 A | 2/2000 | Ambs |
| 6,044,040 A | 3/2000 | Holland |
| 6,061,301 A | 5/2000 | Corrigan |
| 6,144,342 A | 11/2000 | Bertheas et al. |
| 6,175,809 B1 | 1/2001 | Naville |
| 6,178,381 B1 | 1/2001 | Padhi et al. |
| 6,285,956 B1 | 9/2001 | Bennett et al. |
| 6,292,754 B1 | 9/2001 | Thomsen |
| 6,343,256 B1 | 1/2002 | Winbow et al. |
| 6,418,378 B1 | 7/2002 | Nyland |
| 6,477,111 B1 | 11/2002 | Lunde et al. |
| 6,477,711 B1 | 11/2002 | Freeman et al. |
| 6,493,636 B1 | 12/2002 | Dekok |
| 6,525,992 B1 | 2/2003 | Olivier et al. |
| 6,529,832 B1 | 3/2003 | Kerekes |
| 6,553,315 B2 | 4/2003 | Kerekes et al. |
| 6,590,831 B1 | 7/2003 | Bennett et al. |
| 6,629,037 B1 | 9/2003 | Nyland |
| 6,671,223 B2 | 12/2003 | Bittleston |
| 6,684,160 B1 | 1/2004 | Ozbek et al. |
| 6,691,038 B2 | 2/2004 | Zajac |
| 6,714,873 B2 | 3/2004 | Bakulin et al. |
| 6,837,175 B1 | 1/2005 | Gieseke |
| 6,847,896 B1 | 1/2005 | Orban et al. |
| 6,862,531 B2 | 3/2005 | Horne et al. |
| 6,865,487 B2 | 3/2005 | Charron |
| 6,932,017 B1 | 8/2005 | Hillesund et al. |
| 6,944,094 B1 | 9/2005 | Thomsen et al. |
| 7,065,449 B2 * | 6/2006 | Brewster et al. ................ 702/5 |
| 7,080,607 B2 | 7/2006 | Hillesund et al. |
| 7,203,130 B1 | 4/2007 | Welker |
| 7,239,577 B2 | 7/2007 | Tenghamn et al. |
| 7,293,520 B2 | 11/2007 | Hillesund et al. |
| 7,377,224 B2 | 5/2008 | Ryan et al. |
| 7,391,673 B2 | 6/2008 | Regone et al. |
| 7,400,552 B2 | 7/2008 | Moldoveanu et al. |
| 7,403,448 B2 | 7/2008 | Welker et al. |
| 7,616,522 B2 | 11/2009 | Rouquette |
| 7,660,189 B2 | 2/2010 | Vigen et al. |
| 7,679,990 B2 | 3/2010 | Herkenhoff et al. |
| 7,952,522 B2 | 5/2011 | Hohl |
| 7,965,583 B2 * | 6/2011 | Thomas ........................ 367/16 |
| 8,004,930 B2 | 8/2011 | Welker et al. |
| 8,681,580 B2 | 3/2014 | Moldoveanu et al. |
| 9,103,942 B2 | 8/2015 | Moldoveanu et al. |
| 2002/0193947 A1 | 12/2002 | Chamberlain |
| 2003/0067842 A1 | 4/2003 | Sukup et al. |
| 2003/0125878 A1 | 7/2003 | Bakulin et al. |
| 2003/0208320 A1 | 11/2003 | Zajac |
| 2004/0004907 A1 | 1/2004 | Austad et al. |
| 2004/0042341 A1 | 3/2004 | Tenghamn et al. |
| 2004/0066707 A1 | 4/2004 | Tenghamn et al. |
| 2004/0125697 A1 | 7/2004 | Fleming |
| 2004/0240319 A1 | 12/2004 | Carvill et al. |
| 2005/0018537 A1 | 1/2005 | Welker et al. |
| 2005/0180260 A1 | 8/2005 | Planke et al. |
| 2005/0180263 A1 | 8/2005 | Lambert et al. |
| 2005/0194201 A1 | 9/2005 | Tenghamn et al. |
| 2006/0155476 A1 | 7/2006 | Abma |
| 2006/0155477 A1 | 7/2006 | Matson et al. |
| 2006/0215489 A1 | 9/2006 | Solheim et al. |
| 2006/0227657 A1 | 10/2006 | Tveide et al. |
| 2006/0239117 A1 | 10/2006 | Singh et al. |
| 2006/0256653 A1 | 11/2006 | Toennessen et al. |
| 2006/0256654 A1 | 11/2006 | Paulsen |
| 2006/0285435 A1 * | 12/2006 | Robertsson .................... 367/24 |
| 2007/0064526 A1 | 3/2007 | Holo |
| 2007/0104028 A1 | 5/2007 | Van Manen et al. |
| 2007/0115757 A1 | 5/2007 | Soerli et al. |
| 2007/0127312 A1 | 6/2007 | Storteig et al. |
| 2007/0159921 A1 | 7/2007 | Regone et al. |
| 2007/0165486 A1 | 7/2007 | Moldoveanu et al. |
| 2007/0274153 A1 | 11/2007 | Bisley et al. |
| 2007/0294036 A1 | 12/2007 | Strack et al. |
| 2008/0008032 A1 | 1/2008 | Welker |
| 2008/0008037 A1 | 1/2008 | Welker |
| 2008/0239875 A1 | 10/2008 | Alumbaugh et al. |
| 2008/0253225 A1 | 10/2008 | Welker et al. |
| 2008/0267010 A1 | 10/2008 | Moldoveau et al. |
| 2008/0285380 A1 | 11/2008 | Rouquette |
| 2008/0285381 A1 | 11/2008 | Moldoveanu et al. |
| 2009/0122640 A1 | 5/2009 | Hill et al. |
| 2009/0141587 A1 | 6/2009 | Welker et al. |
| 2009/0231953 A1 | 9/2009 | Welker et al. |
| 2009/0245019 A1 | 10/2009 | Falkenberg et al. |
| 2009/0262601 A1 * | 10/2009 | Hillesund et al. .............. 367/16 |
| 2009/0296518 A1 | 12/2009 | Macneill et al. |
| 2009/0310439 A1 | 12/2009 | Hauan et al. |
| 2009/0310440 A1 | 12/2009 | Solheim et al. |
| 2009/0316525 A1 | 12/2009 | Welker |
| 2010/0013485 A1 | 1/2010 | Alumbaugh et al. |
| 2010/0027374 A1 | 2/2010 | Moldoveanu et al. |
| 2010/0118645 A1 | 5/2010 | Welker et al. |
| 2010/0142317 A1 | 6/2010 | Moldoveanu et al. |
| 2010/0238762 A1 | 9/2010 | Hornbostel |

(56) References Cited

U.S. PATENT DOCUMENTS

| | | | |
|---|---|---|---|
| 2011/0158041 | A1 | 6/2011 | Moldoveanu et al. |
| 2011/0158042 | A1 | 6/2011 | Moldoveanu et al. |
| 2011/0176384 | A1 | 7/2011 | Soubaras |
| 2011/0260730 | A1 | 10/2011 | Sudow et al. |
| 2011/0305109 | A1 | 12/2011 | Soubaras |
| 2012/0092956 | A1 | 4/2012 | Soubaras |
| 2012/0134234 | A1 | 5/2012 | Roberts et al. |
| 2012/0213033 | A1 | 8/2012 | Soubaras |
| 2013/0242695 | A1 | 9/2013 | Soubaras |
| 2013/0301384 | A1 | 11/2013 | Hill et al. |
| 2014/0204709 | A1 | 7/2014 | Moldoveanu et al. |
| 2014/0321237 | A1 | 10/2014 | Moldoveanu et al. |
| 2015/0253446 | A1 | 9/2015 | Hauan et al. |
| 2015/0260868 | A1 | 9/2015 | Moldoveanu et al. |

FOREIGN PATENT DOCUMENTS

| | | | |
|---|---|---|---|
| EP | 0 321705 | A2 | 6/1989 |
| EP | 0 347019 | A2 | 12/1989 |
| EP | 0 562781 | A2 | 9/1993 |
| EP | 0 613025 | A1 | 8/1994 |
| EP | 0613025 | B1 | 9/1998 |
| EP | 0681193 | B1 | 8/1999 |
| GB | 2093610 | A | 9/1982 |
| GB | 2144854 | A | 3/1985 |
| GB | 2342081 | A | 4/2000 |
| GB | 2390902 | A | 1/2004 |
| GB | 2424949 | A | 10/2006 |
| GB | 2436206 | A | 9/2007 |
| WO | 8403153 | A1 | 8/1984 |
| WO | 9621163 | A1 | 7/1996 |
| WO | 97-11395 | A2 | 3/1997 |
| WO | 97-30361 | A1 | 8/1997 |
| WO | 97-45006 | A1 | 12/1997 |
| WO | 9828636 | A1 | 7/1998 |
| WO | 0020895 | A1 | 4/2000 |
| WO | 0129580 | A1 | 4/2001 |
| WO | 2004092771 | A2 | 10/2004 |
| WO | 2005062075 | A1 | 7/2005 |
| WO | 2006014750 | A2 | 2/2006 |
| WO | 2007070499 | A2 | 6/2007 |
| WO | 2008-144492 | A2 | 11/2008 |
| WO | 2010-002600 | A2 | 1/2010 |
| WO | 2011-086149 | A1 | 7/2011 |
| WO | 2011-086166 | A1 | 7/2011 |
| WO | 2011-161118 | A1 | 12/2011 |
| WO | 2013-019691 | A1 | 2/2013 |

OTHER PUBLICATIONS

Moldoveanu, et al; Full Azimuth Imaging Using Circular Geometry Acquisition; Leading Edge; vol. 27, No. 7; pp. 908-913; Jul. 2008.
PCT Search Report and Written Opinion; PCT/US2009/031396; May 14, 2009.
IPAU Examination Report (Jun. 21, 2012); AU 2008254856.
SIPO Rejection Decision (Jun. 6, 2012) and SIPO Office Actions (Feb. 6, 2012 and Jul. 20, 2011); CN 200880021257.8.
Mexican associate reportings dated Jul. 2012, Oct. 2011, and Apr. 2011 for IMPI Office Actions; MX/a/2009/012362.
UKIPO Examination Reports (May 18, 2012 and Feb. 13, 2012); GB 1019199.7.
Mexican associate reportings dated Aug. 2012 and Mar. 2012 for IMPI Office Actions; MX/a/2010/013018.
IPAU Examination Report (May 16, 2008); AU 2006252148.
SIPO Office Action (Nov. 19, 2010); CN 200710003980.0.
UKIPO Examination Reports (Jun. 8, 2010, Mar. 17, 2010, Nov. 13, 2009, Aug. 10, 2009 and Feb. 6, 2009) and UKIPO Search Report (Jul. 18, 2007); GB 0700970.9.
Mexican associate reporting dated Jun. 2009 for IMPI Office Action; PA/a/2007/000733.
SIPO Reexamination Notice After Final (May 4, 2014); CN 200880021257.8.
EPO Search Report (Mar. 25, 2014); EP 2010778189.0.
EPO Office Action (Dec. 4, 2013); EP 2008755677.3.
Mexican associate reporting dated Oct. 2013 for IMPI Office Action (Jul. 8, 2013); MX/a/2012/007769.
UKIPO Examination Report (Oct. 16, 2012); GB 1216841.5.
UKIPO Examination Report (Jul. 2, 2012); GB 1019201.1.
Austad, et al.; Marine Seismic Cable Streering and Computerized Control Systems; Society of Exploration Geophysicists, Expanded Abstracts; 2000.
Bittleston, et al; Marine Seismic Cable Streering and Control; EAGE 62nd Conference and Technical Exhibition, Glasgow, Scotland; May-Jun. 2000
Pedersen; A Nautical Study of Towed Marine Seismic Streamer Cable Configurations; Norwegian University of Science and Technology Doctoral Thesis; 1996.
Pedersen; Active 3-D Position Control of Marine Flexible Cylinder Cables with Extremely Large Length/Diameter-Ratio; NTH Department of Marine Hydrodynamics; 1994-1995.
Shames; Mechanics of Fluids, 3rd Ed.; McGraw-Hill; pp. 666-693; 1992.
Pedersen; A Feasibility Study of the Possibilty to Control the Horizontal Position of Seismic Streamer Cables; Division of Marine Hydrodynamics, The Norwegian Institute of Technology; Mar. 1992.
Raven; Automatic Control Engineering, 4th Ed.; McGraw-Hill; 1987.
Shames; Engineering Mechanics—Statics and Dynamics, 3rd Ed.; Prentice Hall; pp. 236-244; 1980.
Longobardo; Automatic Controls; Standard Handbook for Mechanical Engineers; pp. 16-33 through 16-34; 1967.
Lee; An Algorithm for Path Connections and its Applications; IRE Transcations on Electronic Computers; pp. 346-365; Sep. 1961.
Kalman; A New approach to Linear Filtering and Prediction Problems; Trans of ASME—Journal of Basic Engineering; vol. 82 (Series D); pp. 35-45; 1960.
Moldoveanu; "Circular Geometry for Wide-Azimuth Towed-Streamer Acquisition"; EAGE; Jun. 2008.
Hennenfent, et al.; "Simply Denoise: Wavefield Reconstructions via Jittered Undersampling"; Geophysics; vol. 73(2); pp. v19-v28; May-Jun. 2008.
Hennenfent, et al.; "Random Sampling: New Insights into the Reconstruction of Coarsely-Sampled Wavefields"; SEG Annual Meeting; pp. 2575-2579; Oct. 2007.
WesternGeco Q-Technology URL: http://www.westerngeco.com/content/services/q_technology/index.asp 2006.
Bacon, et al.; "3-D Seismic Interpretation"; Cambridge University Press; pp. 18-22 and 25-26; 2003.
Sukup; "Wide Azimuth Marine Acquisition by the Helix Method": The Leading Edge; pp. 791-794; Aug. 2002.
Pan; "Single-Sensor Towed Streamer Improves Seismic Acquisition"; Offshore; Apr. 2002.
Wong, et al.; "Sampling with Hammersley and Halton Points"; 2 Journal of Graphics Tools; pp. 9-24; 1997.
Reilly, et al; "Concentric Circle 3D: Optimization of Salt Diapir Flank Imaging UK Central North Sea"; First Break; vol. 12, No. 9; pp. 463-475; Sep. 1994.
Cole, et al.; "A Circular Seismic Acquisition Technique for Marine Three Dimensional Surveys"; Offshore Technology Conference, 4864; Houston, Texas; May 6-9, 1985.
PCT Search Report and Written Opinion; PCT/US2010/062419; Sep. 26, 2011.
PCT Search Report and Written Opinion; PCT/US2010/035063; Dec. 29, 2010.
PCT Search Report and Written Opinion; PCT/US2009/060864; May 1, 2010.
PCT Search Report and Written Opinion; PCT/US2009/063538; Apr. 30, 2010.
PCT Search Report and Written Opinion; PCT/US2009/047015; Feb. 24, 2010.
PCT Search Report and Written Opinion; PCT/US2009/047019; Jan. 7, 2010.
PCT Search Report and Written Opinion; PCT/US2009/045261; Dec. 23, 2009.

(56) References Cited

OTHER PUBLICATIONS

PCT Search Report and Written Opinion; PCT/US2008/063875; Sep. 16, 2009.
UKIPO examination report (Aug. 10, 2009) and search report (Aug. 7, 2009) for GB 0912870.3.
PCT Search Report and Written Opinion; PCT/US2012/062049; Feb. 25, 2013.
Moldoveanu, et al.; "What is the Next Step After WAZ for Exploration in the Gulf of Mexico"; SEG Houston International Exposition and Annual Meeting; pp. 41-45; 2009.
Wide-Tow Streamer 3D Acquisition: Fundamentals; Tech Link, PGS Geophysical; vol. 5, No. 6; Aug. 2015.
Office Action issued in the related NO application 20070048, dated Aug. 7, 2016 (2 pages).
Office Action issued in the related NO application 20070048, dated Feb. 9, 2016 (9pages).
Qin et al. An Overview of Industrial Model Predictive Control Technology 2 pages.
Philip M. Fontana, Wide-Azimuth towed streamer acquisition offers a bright future for finding new reserves in complex geologic settings, E&P Global Exploration & Production news, CGGVeritas, 3 pages.
Office Action received in the related IN appiication 133/CHE/2007, dated Nov. 3, 2014 (3 pages).
Examination report issued in the related AU application 2015203555, dated Apr. 6, 2016 (4 pages).
Examination report issued in the related AU application 2010249891, dated Jun. 14, 2014 (3 pages).
Office action received in the related MX application MX/a/2011/012110, dated Mar. 10, 2014 (4 pages).
Examination Report issued in the related AU application 2013205494, dated Jun. 10, 2014 (2 pages).
Office Action received in the related CN application 200880021257.8 dated Aug. 4, 2014 (18 pages).
Supplementary European Search Report issued in the related EP application 12344543,3, dated Oct. 2, 2015 (4 pages).
Communication pursuant to article 94(3) issued in the related EP application 12844548.3, dated Oct. 19, 2015 (7 pages).
Office action received in the related MX application MX/a/2014/005027, dated Mar. 19, 2015 (17 pages).
Examination report issued in the related AU application 2009305692, dated May 30, 2014 (3 pages).
Extended European Search Report issued in the related EP application 09821262,4 dated Jul. 10, 2013.
Brink M. et al. "Wide Tow Marine Seismic Surveys: Parallel or Opposite Sail Lines", Offshore Technology Conference, May 5, 1997, pp. 1-10.
Office Action received in the related MX application MX/a/2011/004098, dated May 31, 2013 (2 pages).
Extended European Search Report issued in the related EP Application 09825469.1, dated May 9, 2014 (3 pages).
Office action received in the related MX application MX/a/2011/004876, dated Feb. 18, 2013 (4 pages).
Office action received in the related MX application MX/a/2011/004876, dated Jan. 15, 2014 (2 pages).
Extended European Search Report issued in the related EP application 10841693,4, dated Feb. 25, 2015, (6 pages).
Examination report issued in the related GC application 2011-17519, dated Mar. 5, 2015 ( 3 pages).
Examination report issued in the related GB application 1216843.1, dated Oct. 15, 2012 (3 pages).
Combined Search and Examination report issued in the related GB application 1216843.1, dated Nov. 14, 2012 (4 pages).
Examination report issued in the related GB application 1019201.1, dated Nov. 14, 2012 (5 pages).
Examination report issued in the related GB application 1019201.1, dated Jan. 28, 2013 (2 pages).
Office action issued in the related MX application MX/a/2010/012151, dated Oct. 25, 2013 (4 pages).
Cole, R.—Three dimensional marine seismic data acquisition using controlled streamer feathering. SEG conference in 1988, (3 pages).

* cited by examiner

FILTERING AND PRESENTATION OF HEADING OBSERVATIONS FOR COIL SHOOTING

CROSS-REFERENCE TO RELATED APPLICATIONS

Priority from U.S. Provisional Application Ser. No. 61/061,357, entitled "Filtering and Presentation of Heading Observations for Coil Shooting", filed Jun. 13, 2008, in the name of the inventors Stig Solheim and Kjell Saeten, is hereby claimed under 35 U.S.C. §119(e). This application is also hereby incorporated by reference for all purposes as if set forth herein verbatim.

STATEMENT REGARDING FEDERALLY SPONSORED RESEARCH OR DEVELOPMENT

Not applicable.

BACKGROUND OF THE INVENTION

1. Field of the Invention

The present invention pertains to towed-array marine seismic surveys, and, more particularly, to towed-array marine seismic surveys employing generally advancing curved sail lines.

2. Description of the Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

The exercise of examining subterranean geological formations for deposits of hydrocarbon deposits is known as "seismic surveying". Sometimes the geological formations lie beneath a body of water. This type of seismic survey is known as a "marine" seismic survey. Marine seismic surveys may be performed in salt, fresh, or brackish waters and are not limited to saltwater environments.

One type of marine seismic survey is called a "towed-array" seismic survey. In such a survey, a tow vessel tows an array of equipment along a straight sail, or "preplot", line. The array usually includes a number of seismic streamers, typically up to eight of them, up to several kilometers long. The streamers are populated with a number of instruments, most notably seismic receivers such as hydrophones. Sometimes the array will also include a plurality of seismic sources. As the array is towed, the streamers ideally straighten and roughly parallel each other. Sometimes environmental or survey conditions adversely impact the shape of the array, but this is the ideal shape.

Thus, in conventional seismic survey acquisition, it is typical to determine where the components of equipment deployed in the sea to acquire seismic data are in relation to the sail line. These lines are straight with the exception of special acquisition patterns such as undershoot obstruction avoidance. Another exception is 4D acquisition that has an objective to follow a path that was traversed during an earlier survey.

Traditionally seismic surveys have been shot along straight lines defined by a start and end point defining a sail line. A lot of quality control ("QC") and statistics to users are simply based on a coordinate system with origo in the first point and Y axis in the direction of the second point. Two central numbers used are the "distance across" (or, "DC") and the "distance along", or ("DA"). The distance along is the y coordinate in this coordinate system, and distance across is the x coordinate. The direction from the first to the second point is called the line direction. The sources are usually fired evenly along this line—for example, every 25 m. The point where the source fires is called a "shot point," and each shot point is given a shot point number. The shot point number will decrease or increase along the line.

The survey of some complex subterranean structures benefits from particular types of towed-array surveys sometimes called "wide-azimuth", "rich-azimuth", or multi-azimuth surveys. However, these types of surveys are typically expensive both in terms of survey time and survey resources. One recently developed approach to address these concerns is what is known as a "coil shoot". A coil shoot differs from a traditional shoot significantly in that the path is intended to be curved rather than straight. With coil shooting a seismic 'line' can consist of any sequence of circular segments and straight segments. One difficulty associated with coil shoots is that a lot of the existing statistics and attributes calculated make little sense with coil shooting. With coil shooting a seismic 'line' can consist of any sequence of circular segments and straight segments. The quality control techniques used in conventional surveys with respect to the plan are not meaningful when acquiring a curved acquisition pattern.

Compass filtering and quality control ("QC") is a critical component of navigation for seismic data acquisition. Methods for filtering and quality control of compasses and other heading sensors have been developed for acquisition during which the heading changes very little during an acquisition cycle, usually as a line. The preplot line is the planned vessel trajectory and can be referenced to any heading, such as north, south or the so-called area rotation. (The area rotation is the direction difference between north and the pre-plot line directions.)

Filtering and quality control of compass data in such acquisition circumstances is based on a single non dynamic heading reference frame. Combining data for filter methods such as median or mean, or applying more dynamic filter methods such as a Kalman filter containing a heading change model will succeed to remove noise as long the heading does not change over the period of filtering. When the heading does change over the filter period, it becomes more difficult to distinguish noise from true heading changes and to some degree a lag is introduced to filtering outcome. In a coil shoot, the heading typically changes continuously, or at least very frequently, during the acquisition. Conventional techniques for filtering and QC therefore are inadequate for a coil shoot.

The present invention is directed to resolving, or at least reducing, one or all of the problems mentioned above.

SUMMARY OF THE INVENTION

The presently disclosed technique includes a method that compensates for constantly changing headings as occur during coil shooting acquisition. In one aspect, the presently disclosed techniques include a computer-readable program storage medium comprising: accessing a set of heading data for a seismic spread acquired while traversing a curved path;

and normalizing the accessed heading data to a dynamic frame of reference defined relative to the seismic spread.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementa- tion to another. Moreover, it will be appreciated that such a development effort, even if complex and time-consuming, would be a routine undertaking for those of ordinary skill in the art having the benefit of this disclosure.

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The presently disclosed technique includes a method that compensates for constantly changing headings as occur during coil shooting acquisition. This allows for filtering and quality control of heading data, such as compass data. In one embodiment, the method normalizes the headings to a changing reference direction based on the coil shooting plan. Any reference frame that changes the same or similarly to the heading measurements being filtered and to which quality control is being applied will improve the performance of the filtering and facilitate quality control methods and displays.

Figure 1:
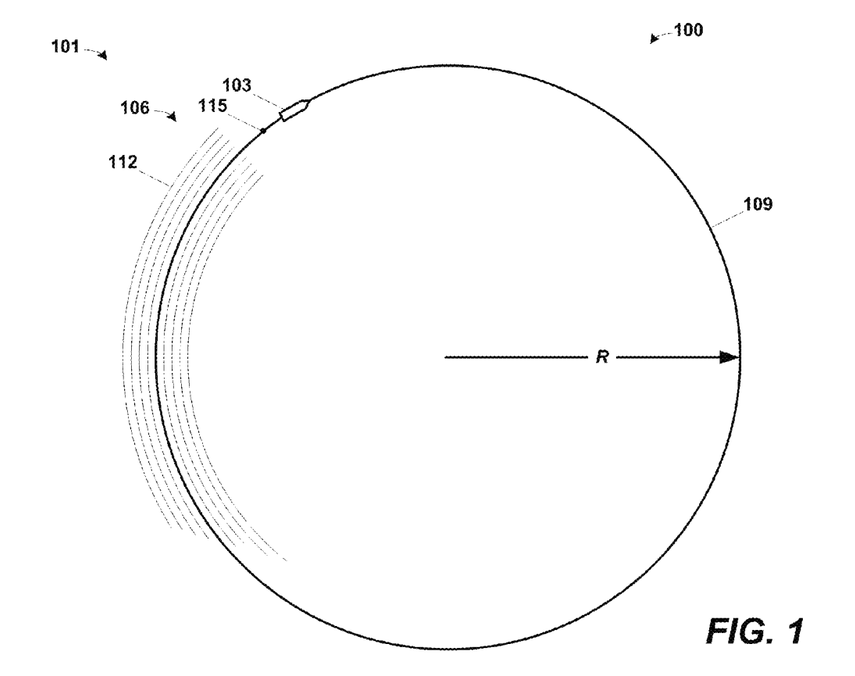
FIG. 1 is a plan, overhead schematic view of a first embodiment of a coil shoot with which the presently disclose technique may be used.

Turning now to the drawings, FIG. 1 depicts a portion of a towed-array, marine seismic survey 100. The seismic survey 100 includes a seismic spread 101, which comprises a survey vessel 103 towing an array 106 on a generally advancing curved path over a sail line 109. In the illustrated embodiment, the array 106 includes a plurality of streamers 112 (only one indicated) and a source 115. As will be discussed further below, the invention admits a high degree of variation in the implementation of the array 106 and the sail line 109. Those in the art will appreciate that the sail line 109 does not actually have a tangible manifestation, and that the line in the drawing graphically represents that which is intangible in practice.

Figure 2:
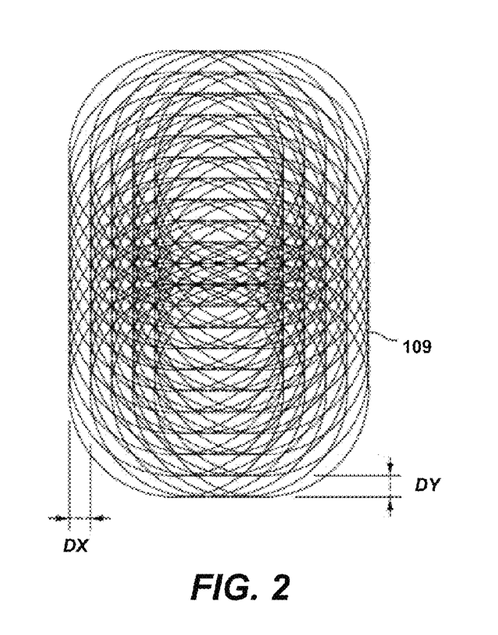
FIG. 2 is a computerized rendition of a plan view of the survey area covered by generally circular sail lines of the embodiment of FIG. 1 over time during a shooting and recording survey.

Those in the art having the benefit of this disclosure will appreciate that the sail line 109 is not truly circular. Once the first pass is substantially complete, the survey 100 will move slightly in the y-direction (vertical) value of DY, as illustrated in FIG. 2. The spread may also move in the x-direction (horizontal) by a value DX. Note that "vertical" and "horizontal" are defined relative to the plane of the drawing.

FIG. 2 is a computerized rendition of a plan view of the survey area covered by the generally circular sail lines of the seismic spread and method of FIG. 1 over time during a shooting and recording survey, where the displacement from circle to circle is DY in the vertical direction and DX in the horizontal direction. In FIG. 2, several generally circular sail lines 109 (only one indicated) cover the survey area. In this example, the first generally circular sail line was acquired in the southeast ("SE") corner of the survey.

When a first generally circular sail line 109 is completed the vessel 103 (shown in FIG. 1) moves along the tangent with a certain distance, DY, in vertical direction, and starts a new generally circular sail line 109. Several generally circular sail lines 109 may be traversed until the survey border is reached in the vertical direction. A new series of generally circular sail lines 109 may then be acquired in a similar way, but the origin will be moved with DX in the horizontal direction. This way of shooting continues until the survey area is completely covered.

The design parameters for designing the survey 100 the radius R of the circle, the radius being a function of the spread width and also of the coverage fold desired; DY, the roll in the y-direction; DX, the roll in the x-direction. DX and DY are functions of streamer spread width and of the coverage fold desired to be acquired. The radius R of the circle may be larger than the radius used during the turns and is a function of the streamer spread width.

The total number of kilometers acquired over a given area depends on the circle radius R and the values DX and DY. The total number of shots acquired with the coil shooting technique disclosed herein increases with increased radius R. DX and DY may range from about 0.5 W to about 2 W, or from about 0.5 W to about W, where W is the streamer spread width. The value of DX and DY may be selected based on the survey objectives. For instance for a development type survey DX and DY should be smaller than for an exploration survey. Also, as DX and DY determine the source sampling, processing requirements should be considered when the survey is designed.

Figure 3:
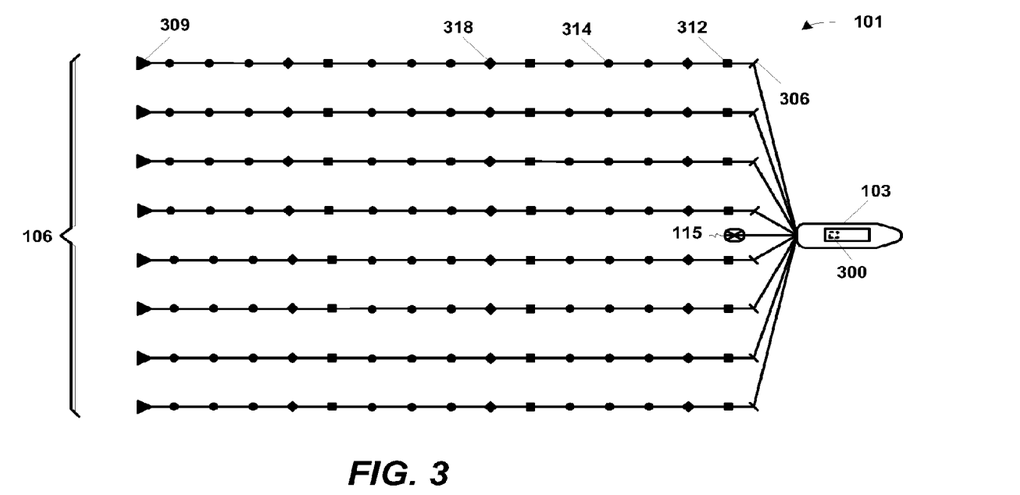
FIG. 3 depicts one particular embodiment of the survey spread first shown in FIG. 1 in a plan, overhead view.

FIG. 3 depicts one particular embodiment of the survey spread 101 in a plan, overhead view. In this particular embodiment, as mentioned above, the seismic spread 101 generally includes an array 106 towed by a survey vessel 103 on board of which is a computing apparatus 300. The computing apparatus 300 controls the seismic spread 101 in a manner discussed more fully below. The towed array 106 comprises eight marine streamers 112 (only one indicated). The seismic source 115 is also included. The survey spread 101 is shown after deployment but before embarking upon the sail line 109, shown in FIG. 1. Consequently, the streamers 112 are shown in a straight arrangement rather than curved one of FIG. 1.

As those in the art will appreciate, the sail lines 109 of the seismic survey 100 are determined with a great deal of consideration. Preliminary data about the area under survey is used to define the characteristics of the survey and the sail lines 109 are determined. These nominal sail lines 109 that are determined prior to the survey may be referred to as "preplots" for the actual sail lines 109 traversed by the seismic spread 101. In the present case, since the survey will employ a coil shoot, the preplots are at least in part curved, and so may be referred to as "preplot curves".

Figure 4:
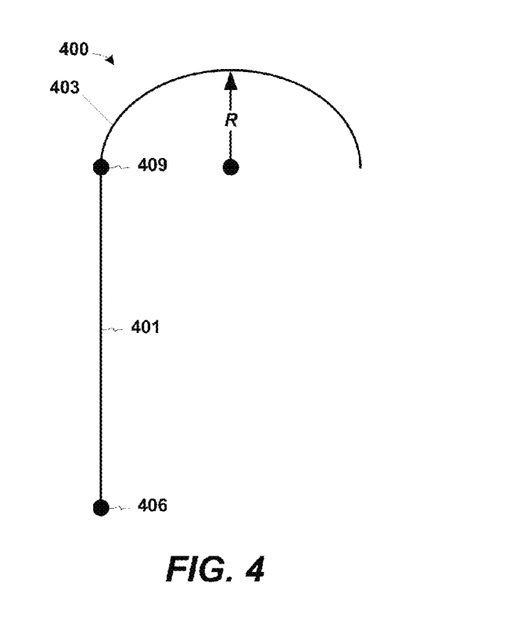
FIG. 4 illustrates a preplot curve and the determination of various characteristics thereof—namely, distance across and distance along.

Turning now to FIG. 4, a preplot curve 400 is a sequence of geographical coordinates and a radius R. (A preplot coordinate will not be on the curve if the preplot coordinate has a radius) The preplot curve 400 gives the nominal position for some point in the survey. This normally coincides with the desired position of a survey element for this point. (For repeat/4D surveys this is not necessarily true—it then describes the nominal position, but not necessarily the desired position.) Often, the preplot curve describes the desired source mid-point position.

The invention normalizes compass heading measurements to a dynamic reference frame to allow better filtering and quality control of compass data. Note the difference between "filtering" and "smoothing". Filtering removes noise from a signal at any time point having only data from before the point in time. Smoothing removes noise from data having data from both before and after a point in time. The application of the presently disclosed technique is for filtering as opposed to smoothing. However, as discussed further below, the technique may be put to other uses as well.

The dynamic reference frame is chosen to isolate noise from actual heading changes. The reference frame can be based on actual heading of a part of the seismic acquisition spread that goes through a representative change in headings that the compass should experience. The dynamic frame of reference may be, for example, the heading of the survey vessel 103 or the heading of the array 106. However, the disclosed technique is not limited to those dynamic frames of reference.

Consider the survey vessel 103. The streamers 112 may not follow the survey vessel 103 heading exactly. Nevertheless, the amount of difference in headings measured through a coil acquisition pattern is much less with the vessel heading reference at each shot compared to a single heading such as north or area rotation. In the ideal case, the survey vessel would go through the heading later measured by the compass (or other heading sensor)—i.e., the streamers follow the vessel trajectory.

In this ideal case, there would be a constant heading component, the heading delay between when the compass reaches the vessel position throughout the line. In addition to this constant shift, there would be noise from the compass instrument. This noise can be filtered or smoothed more accurately if there is no component of heading change present in the data being filtered. For example, median, mean, or a Kalman filter based on a streamer compass relation model can more easily remove noise from actual heading signal if more of the signal is noise than heading change.

Figure 5A:
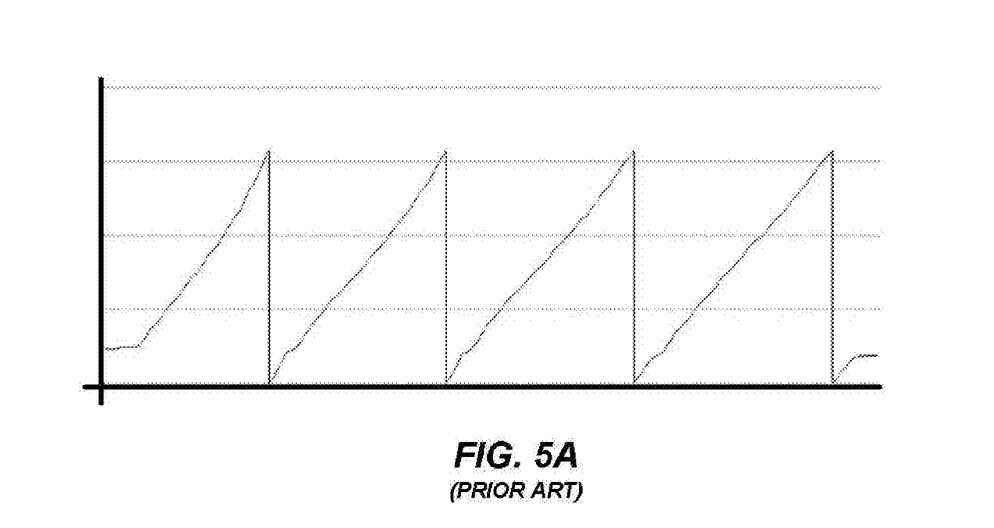
FIG. 5A-FIG. 5B illustrate the application of the technique disclosed herein to heading data for QC purposes.
Figure 5B:
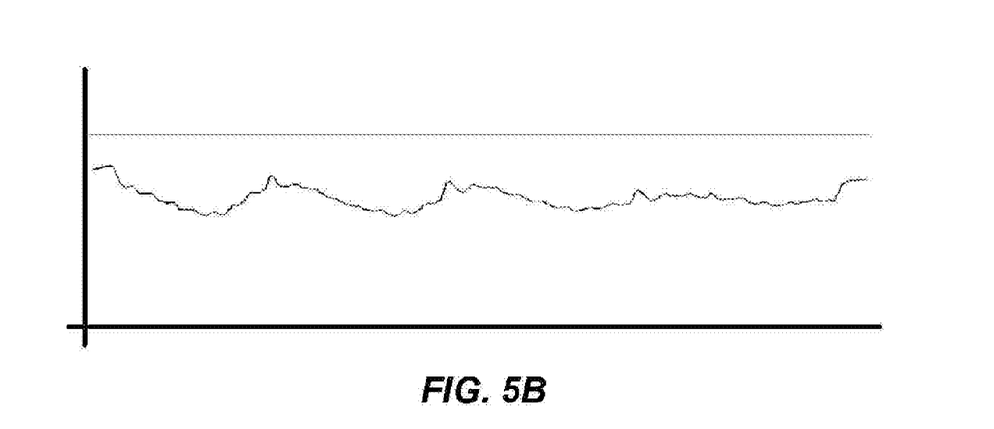

In addition, quality control of the data is improved by normalizing heading data to a dynamic reference frame. One common QC technique is to visually inspect heading data to determine whether to take corrective action. For example, the heading sensor that exhibits a problem may be either re-filtered with more suitable filter parameters or, if the data is so bad that no amount of filtering would result in a usable result, the heading sensor would be excluded from use in the final computations (i.e., the sensor "set passive). Conventional techniques for rendering such data for display as applied to coil shoot data is shown in FIG. 5A. Those skilled in the art having the benefit of this disclosure will appreciate that this display is difficult to use and does not convey much useful information. However, upon application of the technique disclosed herein, the rendered display becomes much useful, as is apparent from FIG. 5B. Note that FIG. 5A-FIG. 5B are not to the same scale and were generated from different sets of synthetic data.

Figure 6:
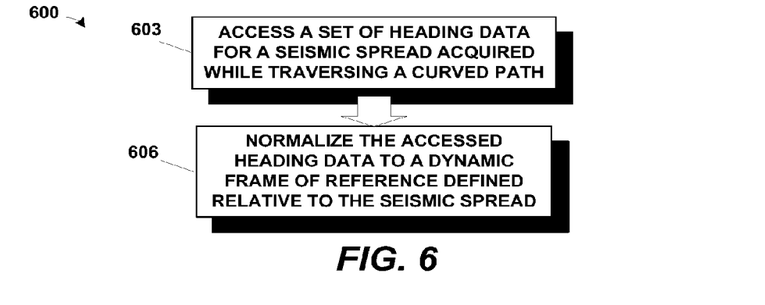
FIG. 6 illustrates one particular embodiment of a method for use in a coil shoot acquisition in accordance with the presently disclosed technique.

Thus, in one aspect, the presently disclosed technique includes a computer-readable program storage medium 600, shown in FIG. 6. The method 600 comprises:

accessing (at 603) a set of heading data for a seismic spread acquired while traversing a curved path; and normalizing (at 606) the accessed heading data to a dynamic frame of reference defined relative to the seismic spread.

The normalized heading data can then be used for a number of purposes such as filtering the heading data and QC.

As was mentioned above, the present invention admits variation in the implementation of the sail lines 109 and those described above are exemplary only. The present invention may be used in connection with any of a number of coil shooting techniques known to the art. Several such techniques are disclosed in U.S. application Ser. No. 12/121,324, filed May 15, 2008, and in U.S. application Ser. No. 11/335,365, filed Jan. 19, 2006. Both of these applications are incorporated by reference below for their teachings with regards to the coil shooting techniques disclosed therein.

As disclosed in those applications, a "generally curved advancing path" is one in which the vessels and streamers travel generally in a curve, and there is an advancement in one or more of the x- and y-directions. The path may be expressed as a coil. The curve may be circular, ovoid (including one or more ovals), elliptical (including one or more ellipses), FIG. 8, sinusoidal, or some other curved path. The path may vary within the same survey; for example, a first portion of the survey may follow an ovoid path, a second portion of the survey may follow an elliptical path, as one of many examples.

Note that the present technique includes methods wherein the survey vessels—and, hence, the seismic spread—travel clockwise or counterclockwise. Generally, there is no intrinsic advantage of one direction over the other. However, in embodiments where a single survey vessel travels along a sincurve both clockwise and counterclockwise there may be an advantage in the presence of localized strong currents. The clockwise versus counter-clockwise directions may be selected at the beginning of each new swath as a function of the currents. It is generally not practical to change direction from circle to circle (for example clockwise then counter-clockwise) due to loss of time.

Also as mentioned above, the invention admits variation in the implementation of the seismic survey spread by which the coil shooting is implemented. Several variations in the composition and configuration of the spread used for coil shooting are disclosed in U.S. application Ser. No. 12/121,324, filed May 15, 2008, and in U.S. application Ser. No. 11/335,365, filed Jan. 19, 2006. Both of these applications are incorporated by reference below for their teachings with regards to the coil shooting techniques disclosed therein, including the composition and configuration of the spread.

Some embodiments employ Q™ and Q-MARINE™ technologies. As used herein, "Q™" is the WesternGeco proprietary suite of advanced seismic technologies for enhanced reservoir location, description, and management. "Q-MARINE™" systems, as discussed herein, refer to the marine seismic spreads employed by WesternGeco and having an accurate positioning system; streamer steering; and advance noise attenuation capabilities. For additional information on Q-Marine™, a fully calibrated, point-receiver marine seismic acquisition and processing system, as well as Q-Land™ and Q-Seabed™, see http://www.westerngeco.com/q-technology.

In these systems, streamers may be equipped with acoustic transmitters and point receivers for accurate position determination, employing intrinsic ranging modulated acoustics, as taught in U.S. Pat. No. 5,668,775 ("the 775 patent"), incorporated below. As taught in the '775 patent, the streamer transmitters and point receivers may form a full-streamer-length acoustic network, wherein a unique spread spectrum code of acoustic frequencies are emitted by each of a plurality of acoustic transmitters placed within the streamers, all frequencies being within the seismic frequencies detected by the same receivers during shooting and recording, and the point receivers within the streamers are able to distinguish each transmitter's unique code. Thus, accurate positioning of seismic receivers is possible. Conventional streamers use arrays of hydrophones, such as 12 or 18 hydrophones per group, which are summed together in analog fashion and than recorded.

Furthermore, the single sensors or point receivers are placed in the streamer at intervals, for example one every 3 m to 4 m, and recorded. All point receivers route data to a computer, where digital filters are applied taking advantage of the very fine sampling of the receivers for very powerful coherent noise attenuation of line swell noise and/or streamer cable noise. During the turns the noise from marine current may be stronger, since at least portions of the streamers may be traveling cross-current. Noise can therefore be attenuated from each point receiver very well. Streamers may also be steered into desired positions by steering devices, as further described herein.

Returning now to FIG. 3, to further an understanding of the present invention, a more thorough discussion of the seismic spread 101 illustrated herein follows. As mentioned above, the seismic spread 101 generally includes an array 106 towed by a survey vessel 103 on board of which is a computing apparatus 300. The towed array 106 comprises eight marine streamers 112 (only one indicated) that may, for instance, each be 6 km long and separated by up to 100 m. Note that the number of streamers 112 in the towed array 106 is not material to the practice of the invention. These aspects of the apparatus may be implemented in accordance with conventional practice.

Note that these distances discussed herein are "approximate." As used herein, the term "approximate" acknowledges that which is commonly known in the art-namely, that it is difficult to consistently maintain the position of the streamers 112 throughout the entire seismic survey 101. Environmental conditions, such as tides and winds, frequently push all or parts of the streamers 112 out of their desired positions during the seismic survey 101. Accordingly, as is discussed further below, the streamers 112 include positioning devices to help offset these types of factors. Deviations from desired positions nevertheless occur and they may affect the crossline cable separation. The term "approximately" is a reflection of this reality and indicates that deviations from the modified distance that are within a degree commonly accepted by those in the industry in this context.

A seismic source 115 is also shown being towed by the survey vessel 103. Note that, in alternative embodiments, the seismic source 115 may not be towed by the survey vessel 103. Instead, the seismic source 115 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum. The seismic source 115 may be implemented using any such source known to the art. In the illustrated embodiment, the seismic source 115 comprises an air gun or an array of air guns.

At the front of each streamer 112 is a deflector 306 (only one indicated) and at the rear of every streamer 112 is a tail buoy 309 (only one indicated). The deflector 306 laterally, or in the crossline direction, positions the front end 113 of the streamer 112 nearest the survey vessel 103. The tail buoy 309 creates drag at the tail end 114 of the streamer 112 farthest from the survey vessel 103. The tension created on the streamer 112 by the deflector 306 and the tail buoy 309 helps shape the streamer 112.

Located between the deflector 306 and the tail buoy 309 are a plurality of seismic cable positioning devices known as "birds" 312. The birds 312 may be located at regular intervals along the seismic cable, such as every 200 m to 400 m. In this particular embodiment, the birds 312 are used to control the depth at which the streamers 112 are towed, typically a few meters. In one particular embodiment, the steerable birds 118 are implemented with Q-Fin™ steerable birds as are employed by WesternGeco, the assignee hereof, in their seismic surveys.

The principles of design, operation, and use of such steerable birds are found in PCT International Application WO 00/20895, filed on Sep. 28, 1999 ("the 895 application"). However, any type of steerable device may be employed. For instance, a second embodiment is disclosed in PCT International Application No. WO 98/28636 filed Dec. 19, 1997 ("the 636 application"). In some embodiments, the birds 118 may even be omitted.

The streamers 112 also include a plurality of instrumented sondes 314 (only one indicated) distributed along their length. The instrumented sondes 314 house, in the illustrated embodiment, an acoustic sensor 700 (e.g., a hydrophone) such as is known to the art, a particle motion sensor 703, and a heading sensor 706, all conceptually shown in FIG. 7. Each of these kinds of sensors admits wide variation in implementation.

Figure 7:
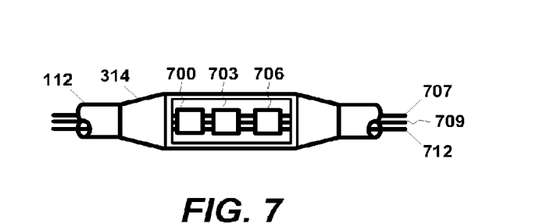
FIG. 7 illustrates the instrumented sondes of the streamers of survey spread in FIG. 3.

The particle motion sensors 703 measure not only the magnitude of passing wavefronts, but also their direction. The sensing elements of the particle motions sensors may be, for example, a velocity meter or an accelerometer. Suitable particle motion sensors are disclosed in: U.S. application Ser. No. 10/792,511, filed Mar. 3, 2004; U.S. application Ser. No. 10/233,266 filed Aug. 30, 2002; and U.S. Pat. No. 3,283,293, issued Nov. 1, 1966. Each of these is incorporated below. Any suitable particle motion sensor known to the art may be used to implement the particle motion sensor 703. In general, it is desirable for the noise measurements of the particle motion sensors 703 be taken as close to the point the seismic data is acquired by the acoustic sensors 700 as is reasonably possible, although it is not necessary that the particle motion sensor 703 be positioned the sensor sonde 314.

The heading sensor 706 may be implemented in any suitable manner known to the art. Compasses are frequently used, but so are gyroscopes. The broader aspects of the present invention are not limited by the nature of the heading data that is used. Accordingly, the heading data may be, for example, compass, gyro, course-made-good data. The heading sensor 706 is also shown housed in the sonde 314. This is primarily for ease of illustration. Those in the art having the benefit of this disclosure will appreciate that the heading sensors may be distributed throughout the array 106, shown in FIG. 1, and not necessarily always in the instrumented sondes 314. The heading sensor 706 may therefore be a part of the array 106 as may be provided for in conventional practice.

The sensors of the instrumented sondes 314 then transmit data representative of the detected quantity over the electrical leads of the streamer 112. The data from the acoustic sensors may be transmitted over separate lines. However, size, weight and power constraints will typically make this desirable. The data generated by the sensors will therefore typically be interleaved with the seismic data, also in accordance with conventional practice.

Thus, the data generated by the sensors of the instrumented sondes 314 is transmitted over the seismic cable to the computing apparatus 300 aboard the survey vessel 103. As those in the art will appreciate, a variety of signals are transmitted up and down the streamer 112 during the seismic survey. For instance, power is transmitted to the electronic components, control signals are sent to positioning elements (not shown), and data is transmitted back to the vessel 103. To this end, the streamer 112 provides a number of lines (i.e., a power lead 707, a command and control line 709, and a data line 712) over which these signals may be transmitted. Those in the art will further appreciate that there are a number of techniques that may be employed that may vary the number of lines used for this purpose. Furthermore, the streamer 112 will also typically include other structures, such as strengthening members (not shown), that are omitted for the sake of clarity.

As those in the art will appreciate, the sail lines preplots are generated prior to the conduct of the survey. Preliminary studies of the survey area are made to determine survey characteristics that inform the design of the survey itself. In association with the presently disclosed technique, this is done in accordance with conventional practice. This is typically performed at a central processing facility of some kind that houses a computing system such as the computing system 800 in FIG. 8, comprising more than one computing apparatus. For example, the preliminary data 801 may reside in a data structure residing on a server 803 and the application 805 by which it is processed on a workstation 806 to generate the survey design 809.

Figure 8:
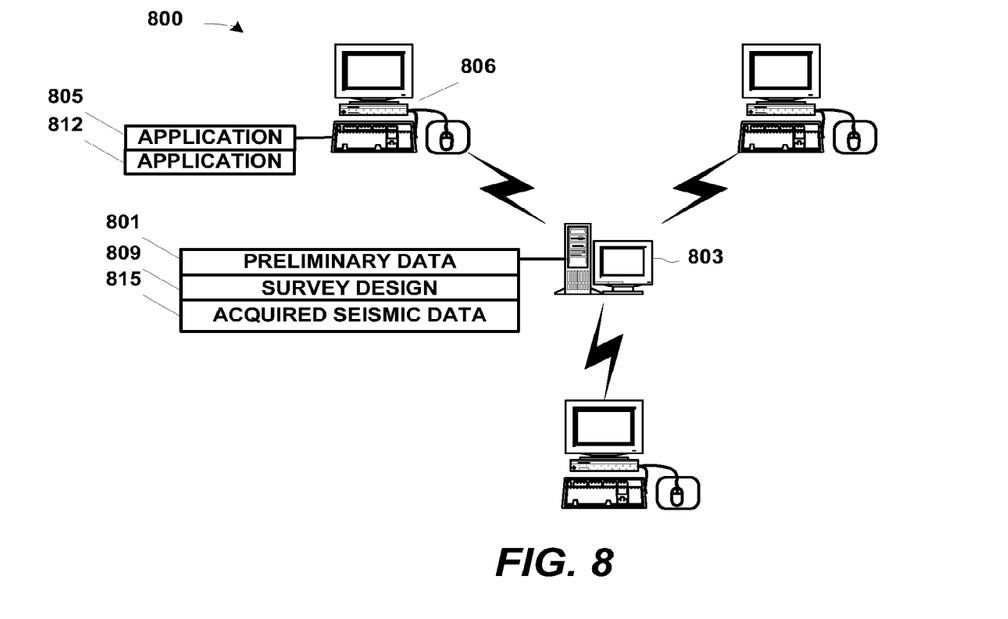
FIG. 8 depicts a computing system on which some aspects of the present invention may be practiced in some embodiments.

The survey design 809 is then transported to the survey vessel 103 and loaded onto the computing apparatus 300. The computing apparatus 300 represents a variety of computing resources that fulfill a number of purposes in the survey 100. For example, and as will be appreciated by those in the art having the benefit of this disclosure, the survey vessel 103 will be equipped with computer-implemented navigation and control systems. However, these functionalities may be distributed across elements of the seismic spread 101 rather than concentrated in a single computing apparatus. Furthermore, the nature of the software control in terms of architecture or situs is material to the practice of the invention. For example, in some embodiments, the navigation and streamer steering may be performed by separate software components that may be, for instance, utilities or daemons.

Figure 9A:
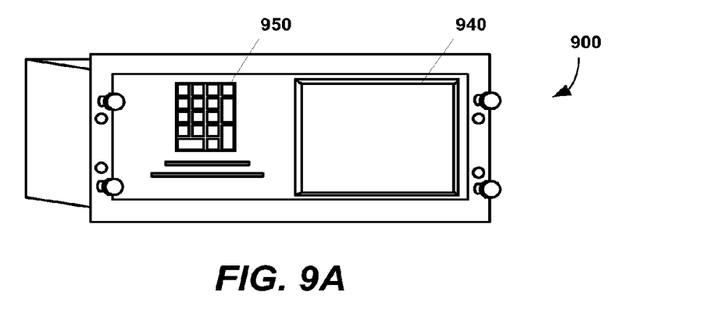
FIG. 9A-FIG. 9B shows a rack mounted computer system such as may be used in some aspects of the present invention.
Figure 9B:
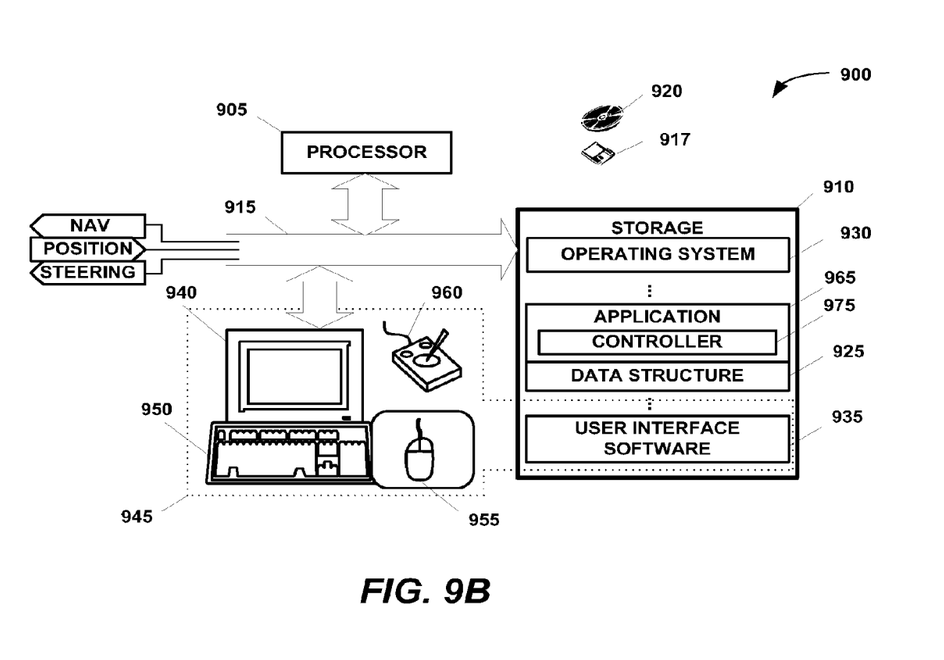

FIG. 9A-FIG. 9B depict a rack-mounted computing apparatus 900 with which the navigation and control systems may be implemented. The computing apparatus 900 includes a processor 905 communicating with some storage 910 over a bus system 915. The storage 910 may include a hard disk and/or random access memory ("RAM") and/or removable storage such as a floppy magnetic disk 917 and an optical disk 920. The storage 910 is encoded with a data structure 925 storing the data set acquired as discussed above, an operating system 930, user interface software 935, and an application 965.

The user interface software 935, in conjunction with a display 940, implements a user interface 945. The user interface 945 may include peripheral I/O devices such as a key pad or keyboard 950, a mouse 955, or a joystick 960.

The processor 905 runs under the control of the operating system 930, which may be practically any operating system known to the art. The application 965 is invoked by the operating system 930 upon power up, reset, or both, depending on the implementation of the operating system 930. The application 965 issues navigation commands ("NAV") to the survey vessel 103 in accordance with its program to sail the survey vessel 103 on the generally advancing curved path of the sail line 109 and to tow the marine seismic streamers 112 and/or source 115, depending on the particular embodiment. The application 965 also, in this particular embodiment, receives positioning data ("POSITION") from the marine seismic streamers 112 and issues steering commands ("STEERING") to the steering devices thereon.

The positioning and steering functionalities described herein relative to the presently disclosed technique are, in the illustrated embodiment, implemented in a pair of modified software packages called TRINAV™ and REPEAT™. In particularly, they are modified to perform the technique disclosed herein. They are proprietary to WesternGeco L.L.C., the assignee hereof.

However, similar software is commercially available from a variety of sources. Concept Systems Ltd. markets a suite of suitable software tools for which additional information may be obtained over the World Wide Web from the company's website at http://www.iongeo.com/About_Us/Business_Units_and_Subsidiaries/Concept_Systems/. Concept Systems can also be contacted directly at 1 Logie Mill, Beaverbank Business Park, Logie Green Road, Edinburgh, EH7 4HG, Scotland, United Kingdom—(ph) +44 131 557 5595, fax +44 131 557 2367. Quest Geo Solutions Ltd. also offers suitable software tools that may be suitable for which additional information may be found on the World Wide Web at http://www.qgsl.com/; or directly Passfield Business Centre, Lynchborough Road, Passfield, Liphook, Hampshire, GU30 7SB, United Kingdom; or at (ph, UK) +44 (0) 1428 751565, (ph, US) +1 281 660 5480, or (fax) +44 (0) 1428 751566. This list is not exhaustive, however. Those of ordinary skill in the art having the benefit of this disclosure will be able modify these and other commercially available software to implement the presently disclosed technique.

Returning to FIG. 9A-FIG. 9B, the application 965 will either implement or invoke a controller 975. The control technique employed by the controller 975 will be implementation specific. A variety of suitable control techniques are disclosed in U.S. application Ser. No. 12/121,324, filed May 15, 2008, and in U.S. application Ser. No. 11/335,365, filed Jan. 19, 2006. Both of these applications are incorporated by reference below for their teachings with regards to the coil shooting techniques disclosed therein, including the control of the shape and position of the spread.

Some embodiments may incorporate one of the so-called Advance Spread Control systems and methods described in assignee's U.S. application Ser. No. 11/122,646, filed Mar. 5, 2005, incorporated below. In these systems, a marine seismic spread includes a vessel-mounted acoustic Doppler current meter to measure at least a horizontal component of a current velocity vector at least at one location generally ahead of the seismic spread elements. The measured horizontal component is then use to control position of a seismic spread element.

One particular embodiment implements these aspects of the disclosed technique include PID controllers. Controllers useful in the systems and methods of the invention may vary in their details. One PID controller useful in the invention may be expressed mathematically as:

$$u(t)=K_p[e(t)+1/T_i \cdot \int e(t)dt+T_d \cdot \dot{e}(t)] \quad (1)$$

wherein:
∫=integrate;
$\dot{e}(t)$=the time derivative;
u(t)=controller output, either meters across to a tracking control device such as that known under the trade designation Robtrack/STS500, or heading to an autopilot;
e(t)=difference between wanted (planned, reference) and measured (current position, y) value;
$T_d$=a constant for describing the derivative part of the algorithm (the derivative part may be filtered to avoid deriving high frequencies);
$T_i$=a constant for describing the integrating part of the algorithm; and
$K_p$=a proportional gain constant.

In the s-plane (Laplace), the PID controller may be expressed as:

$$H_r(s)=K_p[1+1/T_i s+T_d s/(1+T_f s)] \quad (2)$$

wherein:
s=the variable in the s-plane; and
$T_f$=a constant describing the filtering part of the derivative part of the algorithm.

For discretization, a variety of transforms may be employed, and some constants may or may not be useful. For example, the $T_f$ constant may not be necessary in some instances, but may be especially useful in other scenarios. As one discretization example, the z-transform may be used, meaning that the integral part of the algorithm may be approximated by using a trapezoid model of the form:

$$s=(1-z-1)/T \quad (3)$$

while the derivative part may be approximated using an Euler model:

$$s=2/T \cdot (1-z-1)/(1+z-1) \quad (4)$$

wherein T is the sampling time. The resulting discrete model may then be used directly in the steering algorithm. Other discrete models, derived using other transforms, are useful in the invention, and will be apparent to control technicians or control engineers of ordinary skill.

Model Predictive Control ("MPC") is an advanced multivariable control method for use in multiple input/multiple output ("MIMO") systems. An overview of industrial Model Predictive Control can be found at: www.che.utexas.edu/~qincpcv/cpcv14.html. MPC computes a sequence of manipulated variable adjustments in order to optimize the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . . MPC may use any derived objective function, such as Quadratic Performance Objective, and the like, including weighting functions of manipulated variables and measurements.

Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like.

It may be difficult to explicitly state stability of an MPC control scheme, and in certain embodiments of the present invention it may be necessary to use nonlinear MPC. In so-called advance spread control of marine seismic spreads, PID control may be used on strong mono-variable loops with few or non-problematic interactions, while one or more networks of MPC might be used, or other multivariable control structures, for strong interconnected loops. Furthermore, computing time considerations may be a limiting factor. Some embodiments may employ nonlinear MPC.

Feed forward algorithms, if used, will in the most general sense be task specific, meaning that they will be specially designed to the task they are designed to solve. This specific design might be difficult to design, but a lot is gained by using a more general algorithm, such as a first or second order filter with a given gain and time constants.

The introduction of a tracking point may serve at least two purposes. First, it gives a more flexible solution for a track that we want parts of the spread to follow. Second, if other means are used for controlling source positions, like a winch or a source deflector, the vessel will in many occasions have "spare" steering capacity available. This may mean that by moving the tracking point aft of the sources, streamer front ends and consequentially also the receivers may be closer to where they should be, which may help the streamer steering devices in achieving their steering objectives.

In certain embodiments, a tracking point will not be a static point in the spread, as time varying currents may result in the center of source steering objective and the tracking point steering objective unable to be met at the same time. In these embodiments, the tracking point may be moved, either dynamically or non-dynamically, until both objectives can be met with a certain slack. The reverse might also be the case, i.e., having excess steering power resulting in moving the tracking point further aft. If the movement of the tracking point is above a predefined distance, a new set of parameters for both the controller and the feed forward controller may be used to optimize the controller performance.

Note that these are exemplary control techniques only and that they are not exhaustive. Alternative control techniques may be employed in alternative embodiments. The invention is not limited by the type of control technique employed.

Returning to FIG. 3, the computing apparatus 300 receives the seismic data (hydrophone as well as particle motion sensor data), and records it. The computing apparatus 300 also receives the heading data and records it as well. The data is recorded in, for example, a data storage in any suitable data structure known to the art. The computing apparatus 300 interfaces with the navigation system (not shown) of the survey vessel 103. From the navigation system, the computing apparatus 300 obtains estimates of system wide parameters, such as the towing direction, towing velocity, and current direction and measured current velocity.

In the illustrated embodiment, the computing apparatus 300 also monitors the actual positions of each of the birds 312, as well as other elements of the streamers 112. The computing apparatus is programmed with the desired positions of or the desired minimum separations between the streamers 112 as well as other characteristics of the survey. The horizontal positions of the birds 312 can be derived using various techniques well known to the art. The vertical positions, or depths, of the birds 312 are typically monitored using pressure sensors (not shown) attached to the birds 312.

The shape of the streamer 112, and therefore the positions of its elements, during the survey may be determined using any of a variety of techniques known to the art. For instance, satellite-based global positioning system equipment can be used to determine the positions of the equipment. The Global Positioning System ("GPS"), or differential GPS, are useful, with GPS receivers (not shown) at the front and tail of the streamer. In addition to GPS based positioning, it is known to monitor the relative positions of streamers and sections of streamers through an acoustic positioning system comprised of a network of sonic transceivers 318 (only one indicated) that transmit and receive acoustic or sonar signals.

The computing apparatus 300, through execution of a controller 975, shown in FIG. 9A-FIG. 9B, then uses positioning and heading data to navigate the seismic spread 101 along the sail line 109. The controller 975 attempts to hew the sail line 109 to the preplot 400 and to maintain the proper relationship of the spread elements. The positioning data is used to steer the elements of the seismic spread 101 in order to maintain their proper position within the seismic spread 101.

Periodically, the heading data will be reviewed as described above. In traditional straight line survey lines, heading data (compass, gyro, course-made-good) can be inspected by simply plotting the data as-is in a time-series plot. Such plots are typically inspected in order to visually judge the noisiness and continuity of the data. However in a coil/circular type survey line, the data will take a saw tooth shape shown in FIG. 5A, making such visual quality control difficult. This is because, traditionally, heading data is represented relative to true or magnetic North. During the curves of the sail line 109, at least, the relationship of the heading sensor 706 to true or magnetic North will continuously change.

In one particular aspect, the presently disclosed technique converts the heading data prior to display so that the data is presented relative to the azimuth of the traversed path, instead of north. For example, a data point with raw reading 270° (relative to North), taken at a point where the azimuth of the path is 270 would be presented as a value of 270−270=0. As the device traverses through the circle and the circular path azimuth is changing similarly to the raw reading, the presented/converted data will continue to be close to zero (some small variations will exist due to ocean currents and streamer dynamics). The end result is that by referencing the raw readings to a dynamic/rotating reference, as opposed to a fixed reference like North, the data will be presented in such a way that visual quality control of the time-series plotted data is facilitated in the same way as in straight line seismic.

More particularly, the present technique normalizes the heading data to a dynamic frame of reference. Two candidates mentioned above are the heading of the survey vessel 103 and the heading of the array 106 at the time the heading data is acquired. In particular, the time and position of each shotpoint is assiduously tracked during the acquisition. The shotpoints are preplanned as a part of the survey planning. They are therefore associated with a nominal location on the preplot 400 for the sail line 109. A nominal heading for the survey vessel 103 and/or the array 106 can then be determined from the preplot at the time of a given shotpoint.

Figure 10:
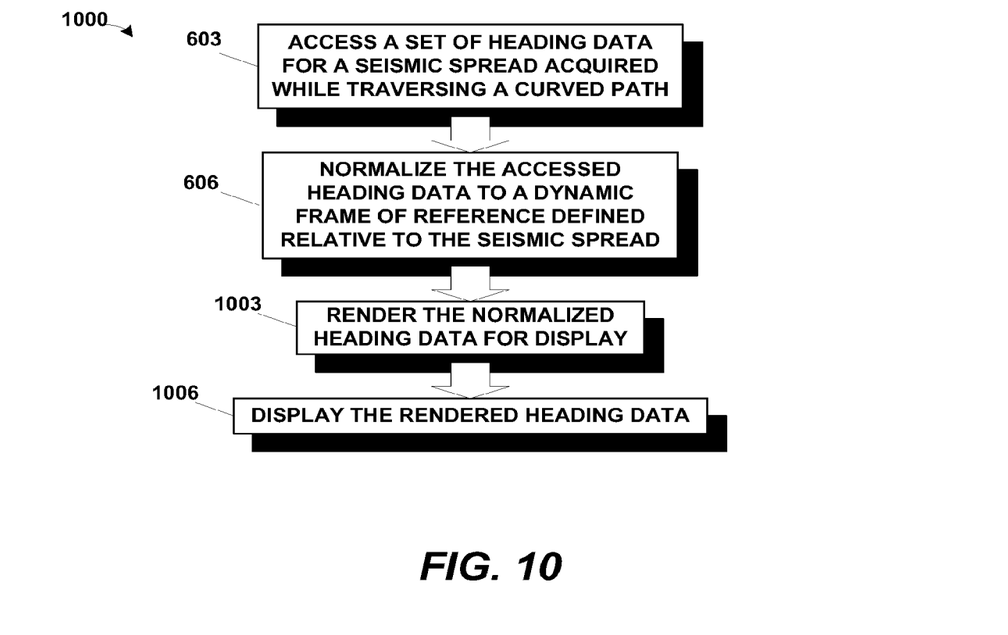
FIG. 10 illustrates one particular embodiment of the method of FIG. 6.

Thus, in accord with this aspect of the presently disclosed technique, there is a method 1000, shown in FIG. 10, comprising:

accessing (at 603) a set of heading data for a seismic spread acquired while traversing a curved path;

normalizing (at 606) the accessed heading data to a dynamic frame of reference defined relative to the seismic spread;

rendering (at 1003) the normalized heading data for display;

displaying (at 1006) the rendered heading data.

Note that the rendering (at 1003) and the displaying (1006) may be performed on the computing apparatus 300 in accordance with conventional practice once the heading data is normalized (at 606) as described above. Accordingly, for the sake of clarity and so as not to obscure the present invention, the rendering (at 1003) and displaying (at 1006) will not be further discussed.

Figure 11:
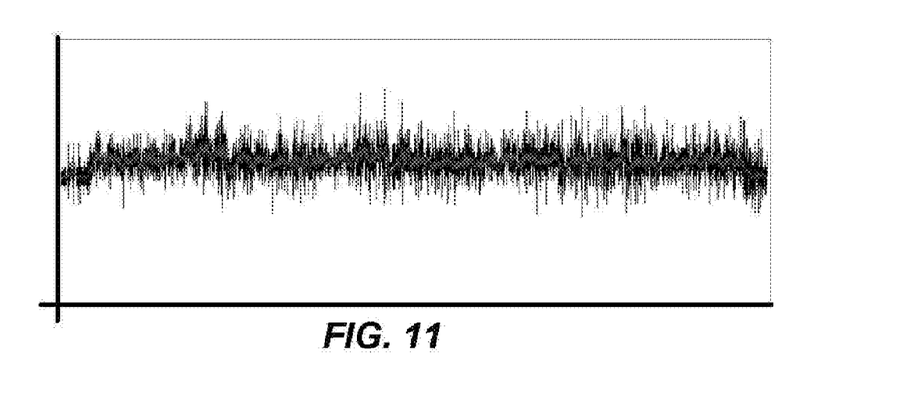
FIG. 11 illustrate an alternative representation displaying the data as the difference from shot point to shot point.

An alternative representation is to display the data as the difference from shot point to shot point as shown in FIG. 11. This will also facilitate visual quality control of noisiness and continuity.

As those in the art having the benefit of this disclosure will appreciate, the types of processing described above will ordinarily occur on board the survey vessel 103. However, this will not always be the case. For example, there may be a problem onboard the survey vessel 103 that may require the data be processed elsewhere, such as a central processing facility housing a computing system such as the computing system 800 in FIG. 8. A second application 812 may therefore perform the method 1000, in FIG. 10, on the acquired seismic data 815. The invention is not limited by these types of variations in the computing resources by which it may be implemented.

As is apparent from the discussion above, some aspects of the present invention are implemented in software executed by a computing apparatus. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The following documents are incorporated by reference herein for all purposes as if set forth herein verbatim:

U.S. application Ser. No. 61/061,330, filed on Jul. 13, 2008, in the name of the inventors Johan Hauan et al., and entitled, "Method to Determine the Deviation of Seismic Equipment from a Planned Curved Path".

U.S. application Ser. No. 11/335,365, filed Jan. 19, 2006, in the name of the inventors Nicolae Moldoveanu and Alan Strudley, and entitled, "Methods and Systems for Efficiently Acquiring Towed Streamer Seismic Surveys".

U.S. application Ser. No. 12/121,324, filed May 15, 2008, in the name of the inventors Nicolae Moldoveanu and Steven Fealy, and entitled, "Methods for Efficiently Acquiring Wide-Azimuth Towed Streamer Seismic Data".

U.S. Provisional Application Ser. No. 60/938,547 filed May 17, 2007, entitled, "Methods for Efficiently Acquiring Wide-Azimuth Towed Streamer Seismic Data", and filed in the name of the inventors Nicolae Moldoveanu and Steven Fealy.

U.S. Provisional Application Ser. No. 60/966,534 (converted from U.S. application Ser. No. 11/836,675, filed Aug. 9, 2007, by petition filed Aug. 31, 2007), entitled, "Methods for Efficiently Acquiring Wide-Azimuth Towed Streamer Seismic Data", and filed in the name of the inventors Nicolae Moldoveanu and Steven Fealy.

U.S. Provisional Application Ser. No. 60/969,203 filed Aug. 31, 2007, entitled, "Methods for Efficiently Acquiring Wide-Azimuth Towed Streamer Seismic Data", and filed in the name of the inventors Nicolae Moldoveanu and Steven Fealy.

U.S. application Ser. No. 11/836,675, filed Aug. 9, 2007, entitled, "Methods for Efficiently Acquiring Wide-Azimuth Towed Streamer Seismic Data", and filed in the name of the inventors Nicolae Moldoveanu and Steven Fealy, which was converted to U.S. Provisional Application Ser. No. 60/966,534 by petition filed Aug. 31, 2007.

U.S. application Ser. No. 11/114,773, filed Apr. 26, 2005, entitled, "Seismic Streamer System and Method", and filed in the name of the inventors Rohitashva Singh, et al., published Oct. 26, 2006, as Patent Publication 20060239117 A1.

U.S. application Ser. No. 11/122,646, filed Mar. 5, 2005, entitled, "Forward Looking Systems and Methods for Positioning Marine Seismic Equipment", and filed in the name of the inventors Ruen Toennessen, et al., published Nov. 16, 2006, as Patent Publication 20060256653 A1.

U.S. Pat. No. 5,668,775, entitled "Methods for Determining the Position of Seismic Equipment, and Applications of the Methods", and issued Sep. 16, 1997, to GECO A.S. in the name of the inventor Kjell Hatteland.

U.S. Pat. No. 6,671,223, entitled "Control Devices for Controlling the Position of a Marine Seismic Streamer", and issued Dec. 30, 2003, to WesternGeco, L.L.C. in the name of the inventor Simon H. Bittleston.

U.S. Pat. No. 3,774,570, entitled "Non-Rotating Depth Controller Paravane for Seismic Cables", and issued Nov. 27, 1973, to Whitehall Electronics in the name of the inventors Raymond H. Pearson.

U.S. Pat. No. 3,560,912, entitled "Control System for a Towed Vehicle", and issued Feb. 2, 1971, to Westinghouse Electric Corporation in the name of the inventors P. G. Spink, et al.

U.S. Pat. No. 5,443,027, entitled "Lateral Force Device for Underwater Towed Array", and issued Aug. 22, 1995, to The United States of America as represented by the Secretary of the Navy in the name of the inventors Norman L. Owsley.

U.S. Pat. No. 3,605,674, entitled "Underwater Cable Controller", and issued Sep. 20, 1971, to Dresser Industries, Inc. in the name of the inventor Raymond C. Weese.

U.S. Pat. No. 4,404,664, entitled "System for Laterally Positioning a Towed Marine Cable and Method of Using Same", and issued Sep. 13, 1983, to Mobil Oil Corporation in the name of the inventor Robert G. Zachariadis.

U.S. Pat. No. 6,525,992, entitled "Devices for Controlling the Position of an Underwater Cable", and issued Feb. 25, 2003, to Input/Output, Inc. in the name of the inventors Andrew W. Olivier, et al.

EP Patent Publication No. EP 0613025, entitled "A Device and Method for Positioning of Towing Systems for Use in Marine Seismic Systems", and filed Feb. 22, 1994, in the name of the inventor Tor Elholm.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   acquiring a set of heading data for a seismic spread while the seismic spread traverses a curved path; and
   normalizing the acquired heading data into converted heading data, wherein the converted heading data is referenced to a dynamic frame of reference defined relative to the seismic spread.

2. The method of claim 1, further comprising:
   rendering the converted heading data for display; and
   displaying the rendered heading data.

3. The method of claim 1, further comprising filtering the converted heading data.

4. The method of claim 3, wherein filtering the converted heading data comprises applying a median filter, a mean filter, or a Kalman filter.

5. The method of claim 1, wherein normalizing the acquired heading data comprises normalizing the acquired heading data to the heading of a towed-array or the heading of a survey vessel.

6. The method of claim 1, wherein acquiring the set of heading data for the seismic spread while the seismic spread traverses the curved path comprises acquiring the set of heading data for the seismic spread while the seismic spread traverses a circular, ovoid, elliptical, FIG. 8, or sinusoidal curved path.

7. A non-transitory computer-readable program storage medium encoded with instructions that, when executed by a computing device, perform a method, comprising:
   accessing a set of heading data for a seismic spread acquired while traversing a curved path; and
   normalizing the accessed heading data into converted heading data, wherein the converted heading data is referenced to a dynamic frame of reference defined relative to the seismic spread.

8. The computer-readable program storage medium of claim 7, further comprising:
   rendering the converted heading data for display; and
   displaying the rendered heading data.

9. The computer-readable program storage medium of claim 7, further comprising filtering the converted heading data.

10. The computer-readable program storage medium of claim 9, wherein filtering the converted heading data comprises applying a median filter, a mean filter, or a Kalman filter.

11. The computer-readable program storage medium of claim 7, wherein normalizing the accessed heading data into converted heading data comprises normalizing the accessed heading data to the heading of a towed-array or the heading of a survey vessel.

12. The computer-readable program storage medium of claim 7, wherein accessing the set of heading data for the seismic spread acquired while traversing the curved path comprises accessing the set of heading data for the seismic spread acquired while traversing a circular, ovoid, elliptical, FIG. 8, or sinusoidal curved path.

13. A programmed computing apparatus, comprising:
   a processor;
   a storage accessible by the processor;
   a software component residing on the storage that, when executed by the processor, will perform a method for determining the deviation of a spread array element from a planned curved path during a towed-array marine seismic survey, the method including:
      accessing a set of heading data for a seismic spread acquired while traversing a curved path; and
      normalizing the accessed heading data into converted heading data, wherein the converted heading data is referenced to a dynamic frame of reference defined relative to the seismic spread.

14. The programmed computing apparatus of claim 13, further comprising:
   rendering the converted heading data for display; and
   displaying the rendered heading data.

15. The programmed computing apparatus of claim 13, further comprising filtering the converted heading data.

16. The programmed computing apparatus of claim 15, wherein filtering the converted heading data comprises applying a median filter, a mean filter, or a Kalman filter.

17. The programmed computing apparatus of claim 13, wherein normalizing the accessed heading data into converted heading data comprises normalizing the accessed heading data to the heading of the towed-array or the heading of a survey vessel.

18. The programmed computing apparatus of claim 13, wherein accessing the set of heading data for the seismic spread acquired while traversing the curved path comprises accessing the set of heading data for the seismic spread acquired while traversing a circular, ovoid, elliptical, FIG. 8, or sinusoidal curved path.

19. A method, comprising:
 traversing a seismic survey spread over a sail line for a curved path;
 evaluating the quality of seismic data acquired during the traversal, including:
  normalizing a set of heading data associated with the seismic data into converted heading data, wherein the converted heading data is referenced to a dynamic frame of reference defined relative to the seismic spread;
  rendering the converted heading data;
  displaying the rendered heading data; and
  evaluating the displayed heading data; and
 determining whether to take corrective action based on the evaluation of the seismic data quality.

20. The method of 19, wherein determining whether to take corrective action comprises:
 re-filtering data from a heading sensor; or
 excluding data from the heading sensor from use in the final computations.

21. The method of claim 19, further comprising filtering the converted heading data.

22. The method of claim 21, wherein filtering the converted heading data comprises applying a median filter, a mean filter, or a Kalman filter.

23. The method of claim 19, wherein normalizing the set of heading data associated with the seismic data into converted heading data comprises normalizing the set of heading data to the heading of a towed-array or the heading of a survey vessel.

24. The method of claim 19, wherein traversing the seismic survey spread over the sail line for the curved path comprises traversing the seismic survey spread over the sail line for a circular, ovoid, elliptical, FIG. 8, or sinusoidal curved path.

\* \* \* \* \*